(12) United States Patent
Martinez

(10) Patent No.: US 12,304,591 B1
(45) Date of Patent: May 20, 2025

(54) BICYCLE ATTACHMENT

(71) Applicant: Juan Martinez, Mesa, AZ (US)

(72) Inventor: Juan Martinez, Mesa, AZ (US)

( * ) Notice: Subject to any disclaimer, the term of this patent is extended or adjusted under 35 U.S.C. 154(b) by 607 days.

(21) Appl. No.: 17/676,934

(22) Filed: Feb. 22, 2022

(51) Int. Cl.
*B62K 5/08* (2006.01)
*B62J 1/12* (2006.01)
*B62J 1/28* (2006.01)
*B62J 7/04* (2006.01)

(52) U.S. Cl.
CPC ...... *B62K 5/08* (2013.01); *B62J 1/12* (2013.01); *B62J 1/28* (2013.01); *B62J 7/04* (2013.01)

(58) Field of Classification Search
CPC ......... B62J 9/20; B62J 1/12; B62J 1/28; B62J 7/04; B62K 5/08; B62K 13/06
See application file for complete search history.

(56) References Cited

U.S. PATENT DOCUMENTS

| | | | |
|---|---|---|---|
| 3,794,352 A * | 2/1974 | Popp | B62K 13/06 |
| | | | D12/114 |
| 3,938,827 A * | 2/1976 | Johnson | B62K 13/06 |
| | | | 280/202 |
| 4,083,392 A * | 4/1978 | Kobayashi | B62J 9/20 |
| | | | 220/495.11 |
| 5,098,155 A | 3/1992 | Graber | |
| 5,261,683 A | 11/1993 | Kurdziel | |
| 5,427,396 A | 6/1995 | Gore | |
| 5,979,921 A | 11/1999 | Derven et al. | |
| 6,688,622 B2 | 2/2004 | Leon | |
| 6,796,575 B2 | 9/2004 | Humes | |
| 6,830,258 B2 | 12/2004 | Foley | |
| 8,419,035 B2 | 4/2013 | Wilson et al. | |

FOREIGN PATENT DOCUMENTS

WO WO-0063065 A1 * 10/2000 ............. B62K 13/06

* cited by examiner

*Primary Examiner* — Scott A Browne
*Assistant Examiner* — Jisun Choi
(74) *Attorney, Agent, or Firm* — Cramer Patent & Design, PLLC.; Aaron R. Cramer

(57) ABSTRACT

A bicycle attachment is a bench style seating device capable of being secured upon two bicycles. The seat of the bench covers the seat post of each bicycle. A pair of underside cages secure over each rear tire of each bicycle. The attachment has a steering linkage which has a pair of clamps, a pair of alignment rods, and a connecting rod. The bench has a seat assembly which in turn has a seat base and a back rest, a seat base support.

2 Claims, 9 Drawing Sheets

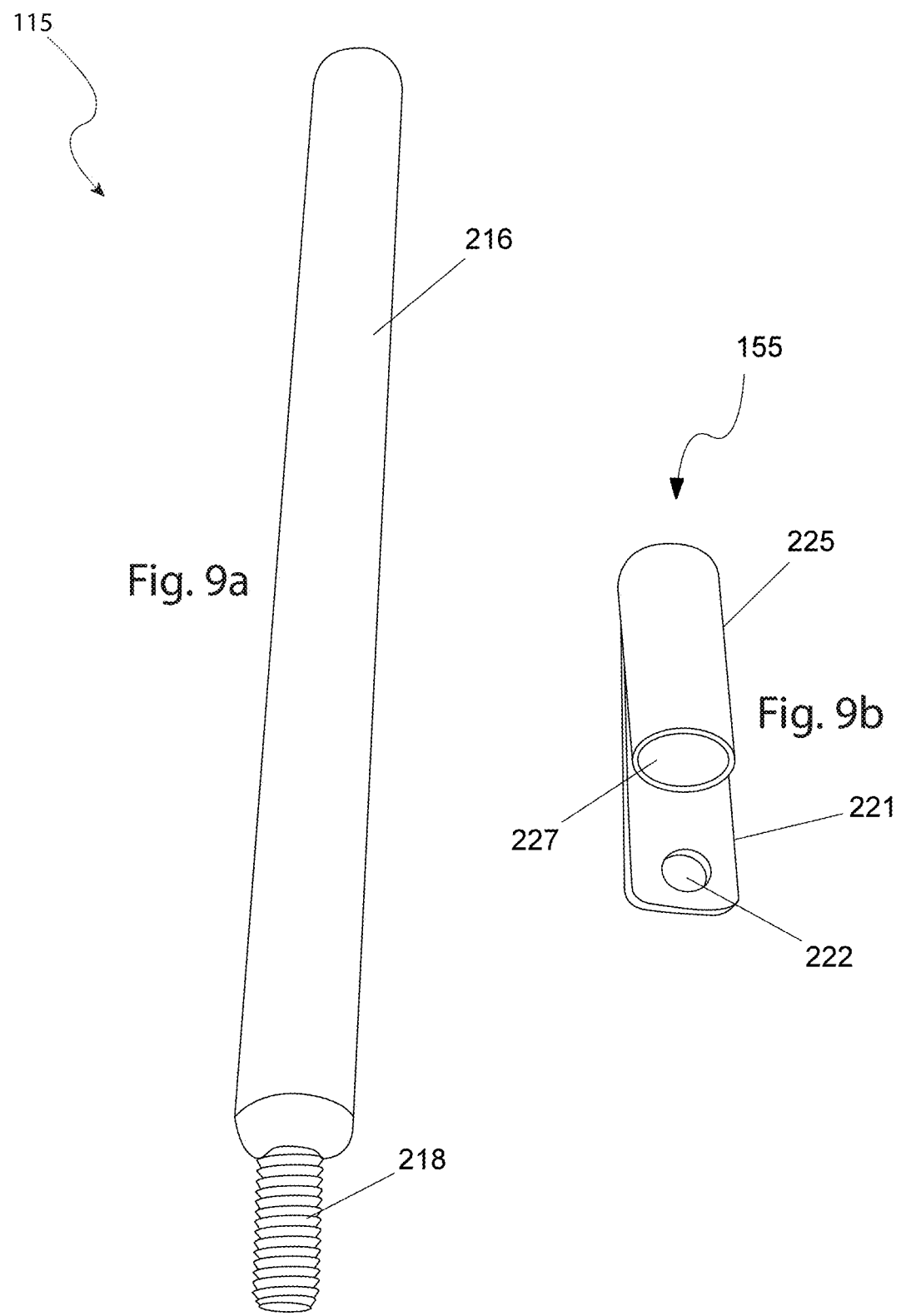

BICYCLE ATTACHMENT

RELATED APPLICATIONS

None.

FIELD OF THE INVENTION

The presently disclosed subject matter is directed to an attachment and more specifically to a bicycle attachment.

BACKGROUND OF THE INVENTION

Modern concerns over health and physical fitness have produced an abundance of people who religiously participate in a variety of exercise regimens in order to stay in shape. One of the most popular exercise activities involves bicycle riding. The muscular and cardiovascular work-out associated with this activity makes it an effective means by which to stay fit. Those bike riders who ride in pairs often turn to the use of a four-wheel bicycle thus allowing two people to ride side-by-side in a parallel manner.

While certainly fun to ride, such cycles are expensive, and take up a good deal of space in a garage, especially when one keeps conventional bicycles as well. Accordingly, there exists a need for a means by which the benefits and fun of a four-wheel bicycle can be enjoyed in a manner which addresses the above concerns. The development of the bicycle attachment fulfills this need.

SUMMARY OF THE INVENTION

The principles of the present invention provide for a four-wheel bicycle conversion kit, that has, a steering linkage having a pair of clamps, a pair of alignment rods, and a connecting rod, and a seat assembly having a seat base and a back rest, a seat base support includes a pair of box frame assemblies and a carrier basket. The four-wheel bicycle conversion kit is adapted to converting a pair of two-wheel bicycles into a single four-wheel bicycle.

The steering linkage may include a steering vector "v" that aligns with the pair of two-wheeled bicycles such that when a first pair of handlebars may be turned on one of the pair of two-wheeled bicycles, an identical motion may be produced on a second pair of handlebars on one of the pair of two-wheeled bicycles. The steering linkage with the clamp, the alignment rods, and the connecting rods may be mounted on the pairs of handlebars. The steering linkage and the seat assembly may work together to keep a frame of both of the pair of two-wheeled bicycles parallel at all times. The back rest may be supported by a pair of vertical supports each having a vertical support bracket which connect to the seat base support. The seat base support may support the seat base, the back rest, and the pair of vertical supports.

The seat base support may include two forward upright structural members for each of the pair of two-wheeled bicycles. The seat base support may be a six-sided frame having the forward upright structural member, four aft upright structural members, a bottom structural member, a top structural member, and a pair of seat connections each located on a seat connection support. The carrier basket may be disposed between the box frame assemblies and shares an inner pairs of forward upright structural members, an inner pairs of aft upright structural members, a central portion of a pair of bottom structural members, and a central portion of a pair of top structural members to create a box-like structure. The seat connection may support extend forwardly from the pair of top structural members and cantilever towards the front of the pair of two-wheeled bicycles to provide support for the seat base. The carrier basket may have a carrier basket rear wall that may cover an area between the inner pairs of the aft upright structural members, the central portion of the rear of the bottom structural member, and the central portion of the rear of the top structural member. A carrier basket front wall may be smaller in height than the carrier basket rear wall and the carrier basket side walls adapted to enable a user to place one or more items therein. The forward structural member and the aft structural member may each be a single piece of framing. The bottom member and the top structural member may each be four-sided frame members.

The seat base support may include the pair of box frame assemblies bracketing the carrier basket therebetween. A pair of carrier basket side walls may cover an area between the inner forward upright structural member, the inner aft upright structural member, the bottom structural member, and the top structural member of each respective side. A carrier basket bottom wall may cover an area between the central portion of the bottom structural member. The carrier basket walls may be made of a mesh material. The carrier basket walls may be made of a weaved fabric material. The seat base may be a planar member and may have a width at least generally coextensive with a width of the pair of two-wheeled bicycles.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 9a is a close-up view of a forward upright structural member, according to the preferred embodiment of the present invention;

FIG. 9b is a close-up view of a mounting bracket, according to the preferred embodiment of the present invention;

Figure 1:
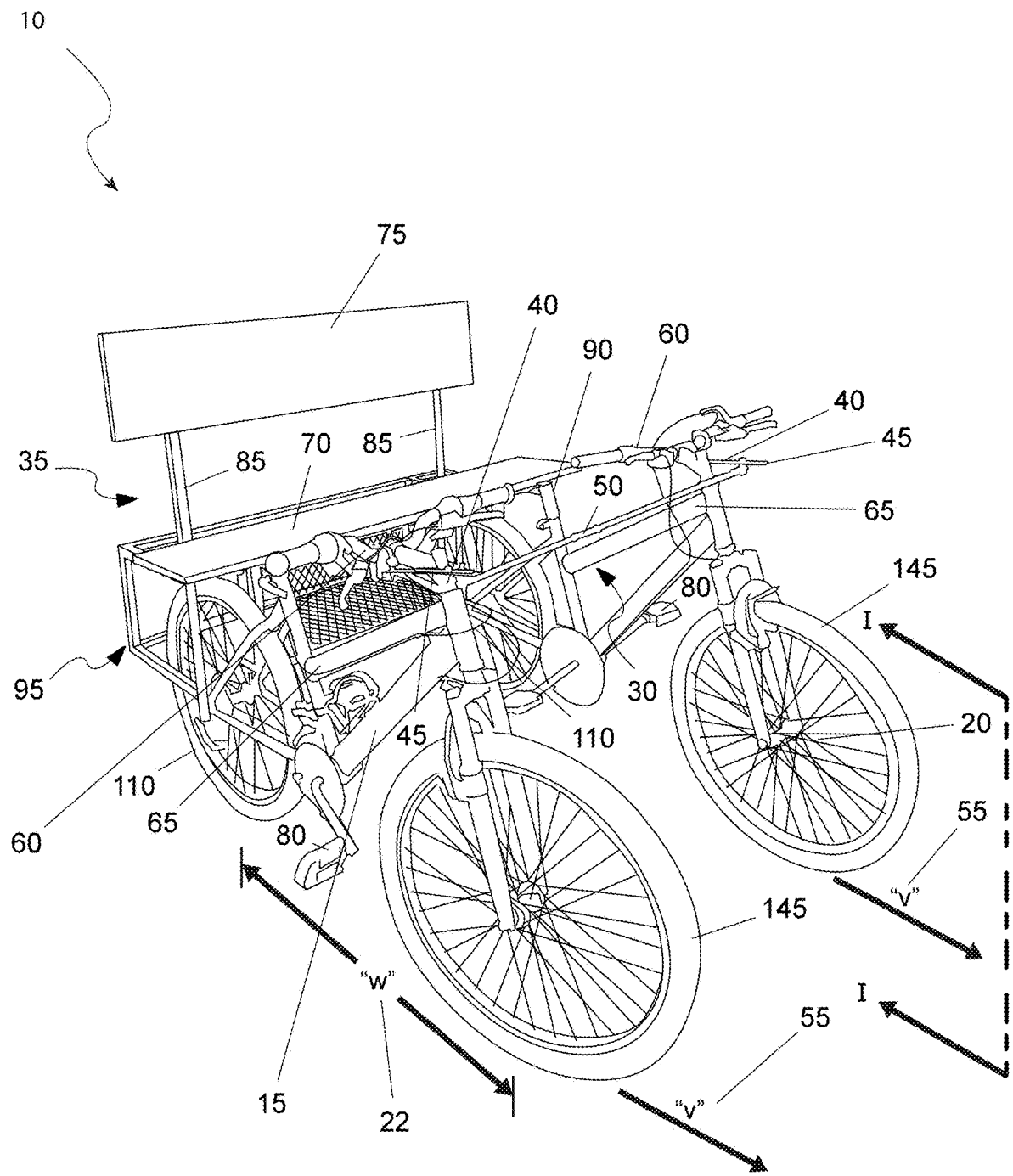
FIG. 1 is a perspective view of the four-wheel bicycle conversion kit, according to the preferred embodiment of the present invention.

DESCRIPTIVE KEY 10 four-wheel bicycle conversion kit
15 two-wheeled bicycle
20 diameter "d"
22 wheelbase "w"
30 steering linkage
35 seat assembly
40 clamp
45 alignment rod
50 connecting rod
55 steering vector "v"
60 handlebar
65 frame
70 seat base
75 back rest
80 pedal
85 vertical support
86 vertical support bracket
89 seat connection support
90 seat connection
95 seat base support
100 seat post
105 box frame assembly
110 rear wheel
115 forward upright structural member
120 aft upright structural member
125 bottom structural member
130 top structural member
135 carrier basket
136 basket rear wall
137 basket front wall
138 basket side wall
139 basket bottom wall
140 pivot point
145 front wheel
150 rear axle
155 mounting bracket
160 axle nut
165 weldment
216 upright tubular portion
218 upright threaded portion
221 bracket planar portion
222 aperture
225 bracket tubular portion
227 threaded receiver

DESCRIPTION OF THE PREFERRED EMBODIMENTS

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the four-wheel bicycle conversion kit 10, according to the preferred embodiment of the present invention is disclosed. The four-wheel bicycle conversion kit 10 (herein also described as the "kit") 10, is capable of converting two (2) conventional two-wheel bicycles into one (1) four-wheel bicycle. The two-wheeled bicycles 15 having a diameter "d" 20 and a wheelbase "w" 22 as shown are identical in nature; however, different styles of two-wheeled bicycles 15 may be utilized. The kit 10 includes two (2) major components: a steering linkage 30 and a seat assembly 35 having a seat base support 95 with attached box frame assemblies 105 and a carrier basket 135. The steering linkage 30 includes two (2) clamps 40, two (2) alignment rods 45 and a connecting rod 50. The steering linkage 30 provides for a steering vector "v" 55 that aligns with both two-wheeled bicycles 15, such that when the handlebar 60 is turned on one (1) of the two-wheeled bicycles 15, an identical motion is produced on the other handlebar 60 and vice-versa. The steering linkage 30 and the seat assembly 35 work together to keep the frame 65 of both two-wheeled bicycles 15 parallel at all times. The seat assembly 35 includes a seat base 70 and a back rest 75 which capable of accommodating two (2) users. Both users will have access to their own handlebar 60 and pedals 80 in order to propel and steer the kit 10. The back rest 75 is supported by two (2) vertical supports 85 which connect to a seat base support 95. The seat base support 95 will be described in greater detail herein below.

Figure 2:
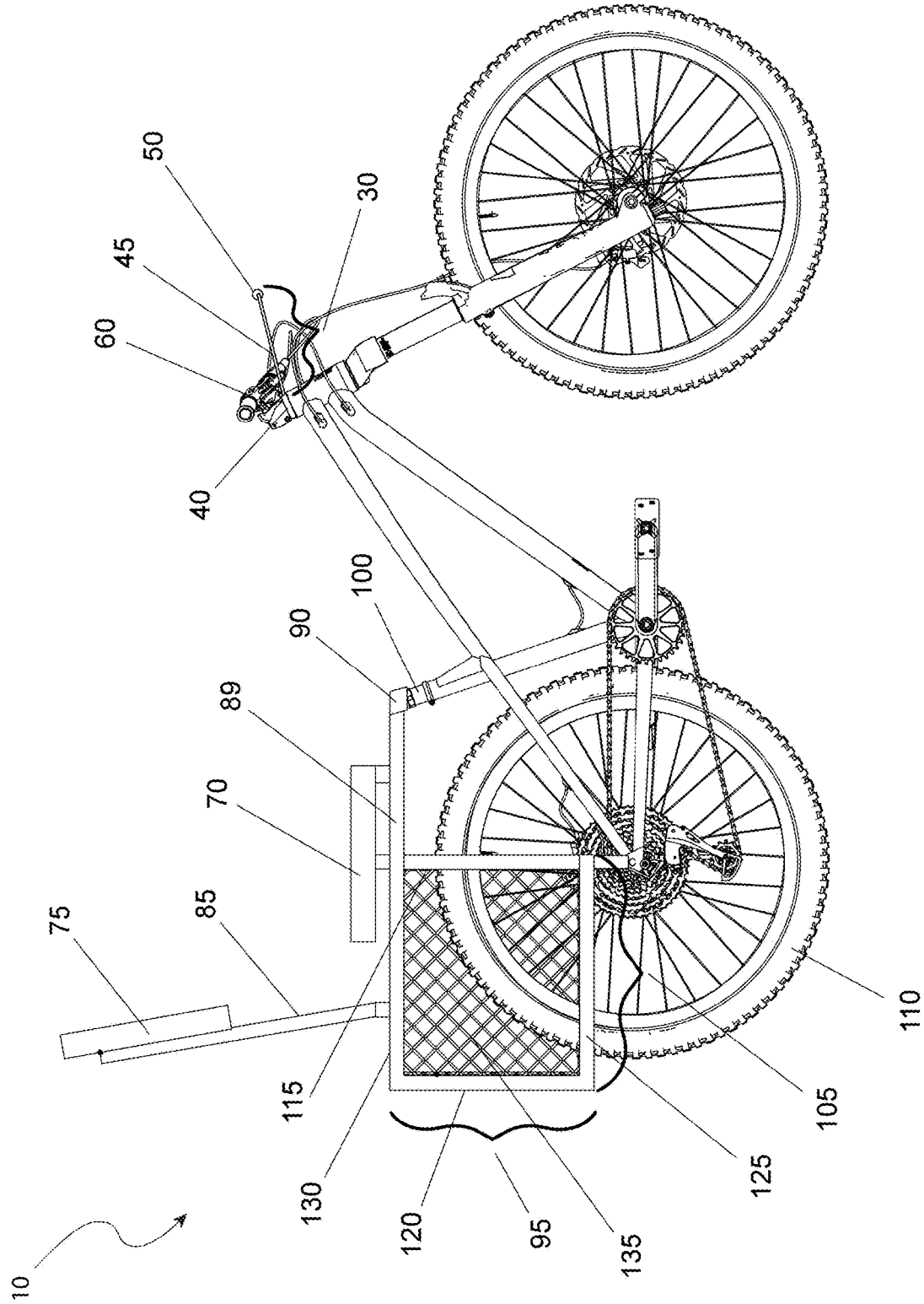
FIG. 2 is a side view of the four-wheel bicycle conversion kit, according to the preferred embodiment of the present invention.

Referring next to FIG. 2, a side view of the kit 10, according to the preferred embodiment of the present invention is depicted. This view provides additional clarification on the configuration of the steering linkage 30 with the clamp 40, the alignment rods 45, and the connecting rods 50 mounting on the handlebars 60. Additionally, the seat base support 95 provides support for the seat base 70, the back rest 75, and the vertical supports 85. It is noted that the seat post 100 does not have a bicycle seat as would be typically expected on a conventional two-wheeled bicycle 15. The existing seat is removed as part of the kit 10 installation.

Referring now more closely to FIGS. 5-8, the seat base support 95 includes four (4) forward upright structural members 115 (of which only one (1) is shown in FIG. 2, due to illustrative limitations). There are two (2) forward upright structural members 115 per two-wheeled bicycle 15, one (1) on each side of each rear wheel 110 and removably attachable thereto. The seat base support 95 is constructed as a six-sided frame including the forward upright structural member 115, four (4) aft upright structural members 120, a bottom structural member 125, a top structural member 130, and a pair of seat connections 90 located on seat connection supports 89. The forward and aft structural members 115, 120 are single pieces of framing and the bottom and top structural members 125, 130 are four-sided frame members.

The seat base support 95 is constructed as having two (2) box frame assemblies 105 bracketing a carrier basket 135 therebetween. Each box frame assembly 105 includes a pair of forward upright structural members 115, a pair of aft upright structural members 120, a portion of the bottom structural member 125 and a portion of the top structural members 130 to create a box-like structure.

The carrier basket 135 is disposed between the box frame assemblies 105 and shares inner pairs of forward upright structural members 115, inner pairs of aft upright structural members 120, a central portion of a pair of bottom structural members 125 and a central portion of a pair of top structural members 130 to create a box-like structure. The carrier basket 135 also has a basket rear wall 136 that covers the area between the inner pairs of the aft upright structural members 120, the central portion of the rear of the bottom structural member 125 and the central portion of the rear of the top structural member 130. The basket front wall 137 covers a portion of the area between the inner pairs of the forward upright structural members 115, the central portion of the forward of the bottom structural member 125 and the central portion of the forward of the top structural member 130. A pair of basket side walls 138 covers the area between the inner forward upright structural member 115, the inner aft upright structural member 120, the bottom structural member 125 and the top structural member 130 of each respective side. The basket bottom wall 139 covers the area between the central portion of the bottom structural member 125. The basket walls 136, 137, 138, 139 comprises a mesh or weaved fabric material is provided for transport of personal items. The basket front wall 137 is smaller in height than the basket rear wall 136 and basket side walls 138 in order to enable a user to place items therein.

The seat connection supports 89 extend forwardly from the pair of top structural members 130 and cantilever toward to the front of the two-wheeled bicycles 15 to provide support for the seat base 70. The seat connection supports 89 each terminate in a seat connection 90. Such support is provided by attaching or otherwise connecting each seat connection 90 to a respective seat post 100 on the two-wheeled bicycles 15.

The seat base 70 is a planar member and has a width at least generally coextensive with the width of the two (2) two-wheeled bicycles 15. The seat base is either directly attached or otherwise connected to the top structural member 130 or indirectly attached (e.g., shocks, offset brackets, etc.). The back rest 75 is supported to the seat base support 95 via a pair of vertical supports 85 each having a vertical support bracket 86. More specifically, the back rest 75 is a planar member having a width generally coextensive with the width of the seat base 70. The vertical support brackets 86 are attached or otherwise connected to the top structural member 130 of the seat base support 95, preferably equidistant from a bisecting centerline of the seat base support 95 and back rest 75. A vertical support 85 is attached at distal ends to the back rest 75 and the vertical support brackets 86.

Figure 3:
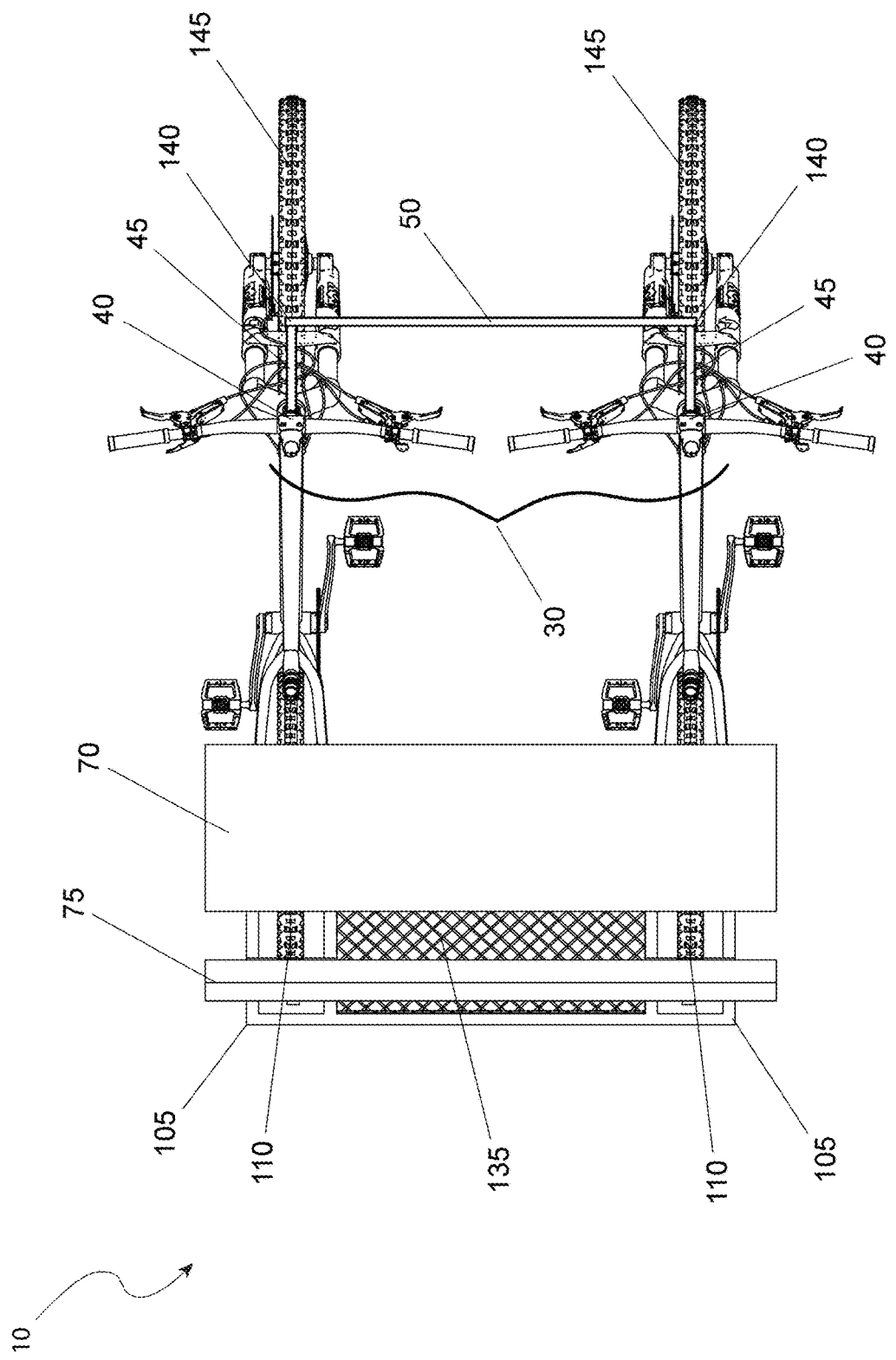
FIG. 3 is a top view of the four-wheel bicycle conversion kit, according to the preferred embodiment of the present invention.

Referring now to FIG. 3, a top view of the kit 10, according to the preferred embodiment of the present invention is shown. The connecting rod 50 is connected to the two (2) alignment rods 45 by a pivot point 140. The alignment rods 45 are connected to the handlebars 60 by the clamp 40 as aforementioned described. The functionality of the steering linkage 30 provides for parallel movement of the front tires 145. The box frame assemblies 105 are visible over the rear tires 110 and provide structural support for the seat base 70 and the back rest 75 either directly or indirectly as aforementioned described. The carrier basket 135 in between the box frame assemblies 105 provides a large capacity, suitable for multiple bags of grocers, golf clubs, picnic items or the like. This capacity is multiple levels beyond that of a single two-wheeled bicycle 15 or even two (2) separate two-wheeled bicycles 15.

Figure 4:
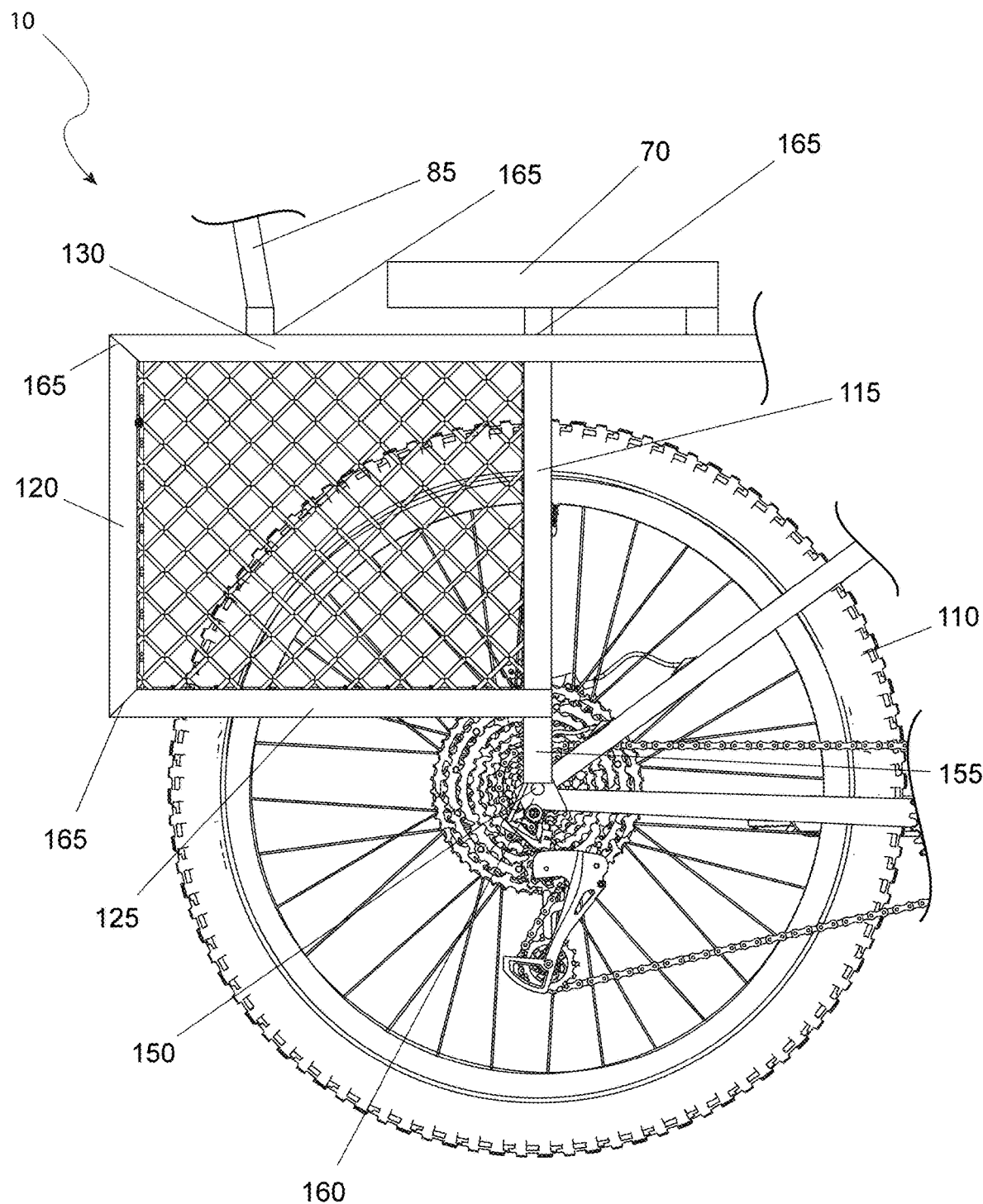
FIG. 4 is a sectional view of the four-wheel bicycle conversion kit, as seen along a Line I-I, as shown in FIG. 1, according to the preferred embodiment of the present invention.
Figure 5:
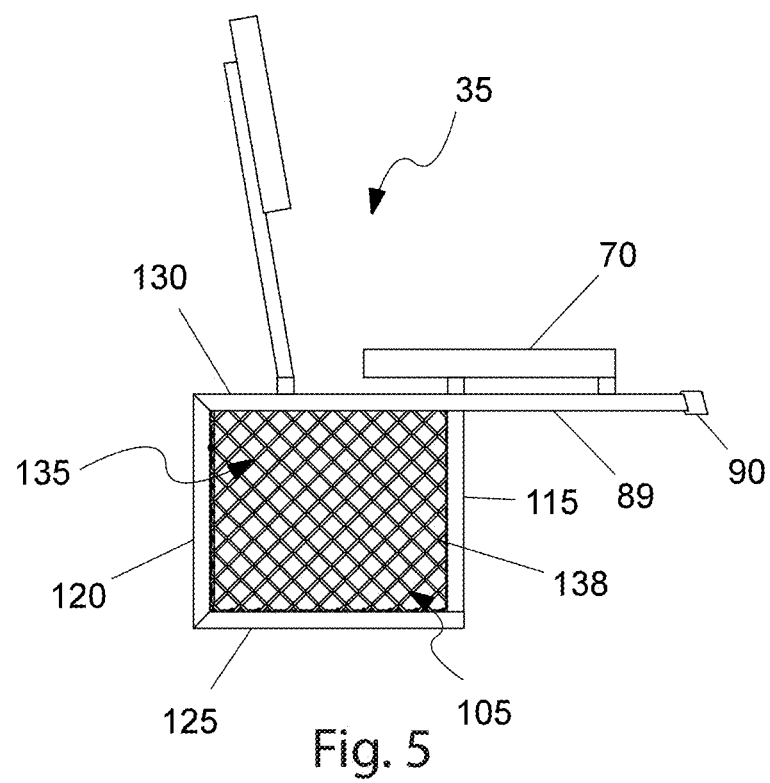
FIG. 5 is an isolated side view of the seat assembly and seat base support, according to the preferred embodiment of the present invention.
Figure 6:
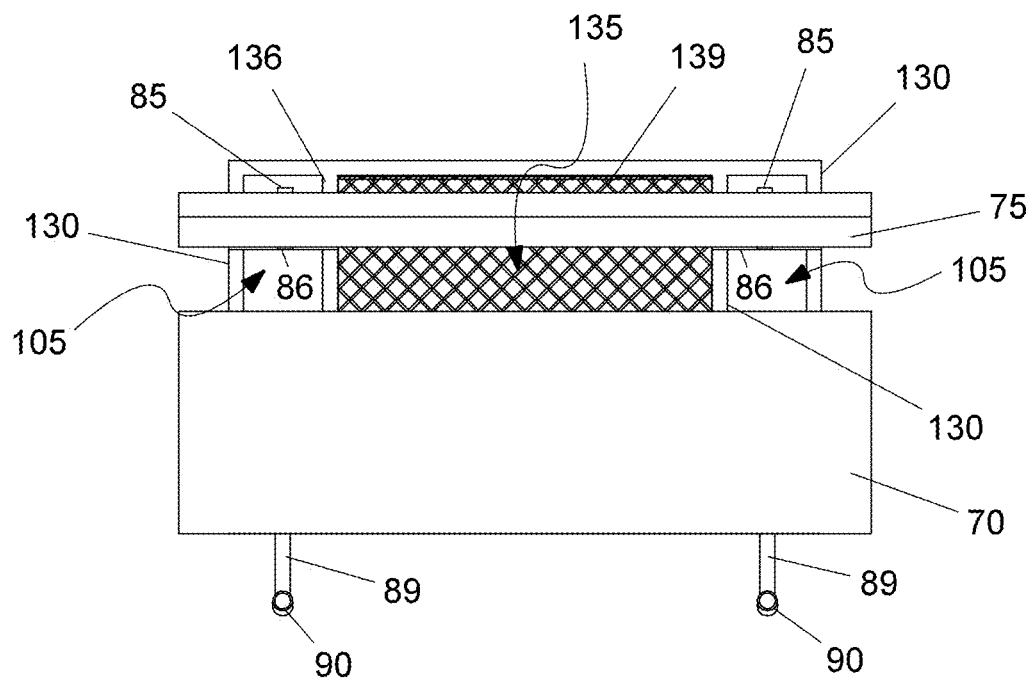
FIG. 6 is an isolated top view of the seat assembly and seat base support, according to the preferred embodiment of the present invention.
Figure 7:
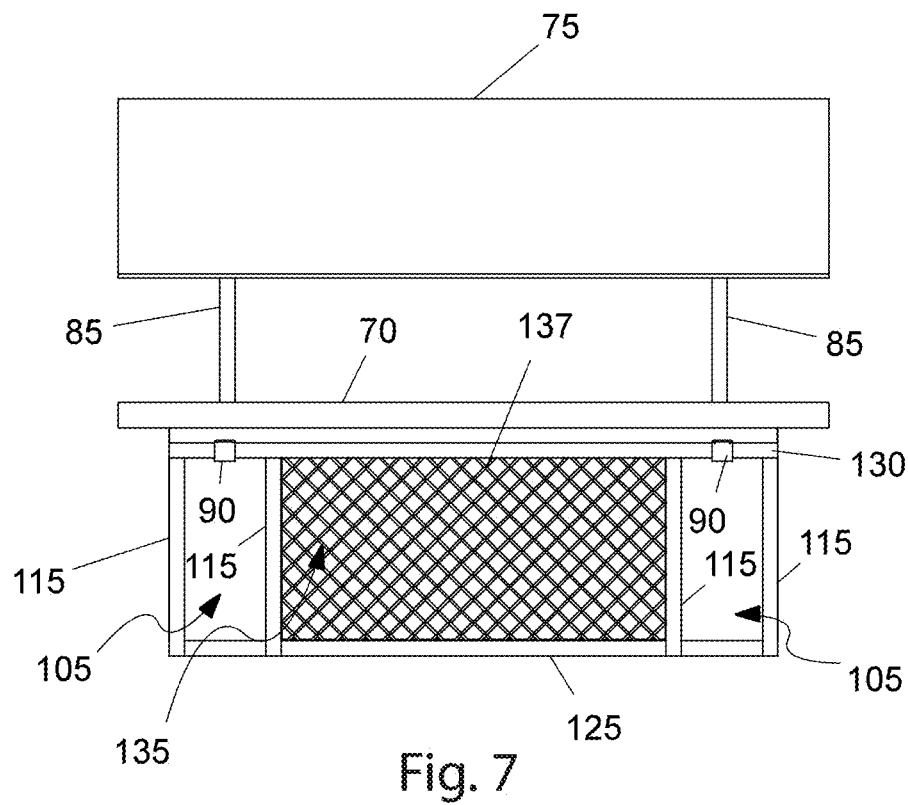
FIG. 7 is an isolated front view of the seat assembly and seat base support, according to the preferred embodiment of the present invention.
Figure 8:
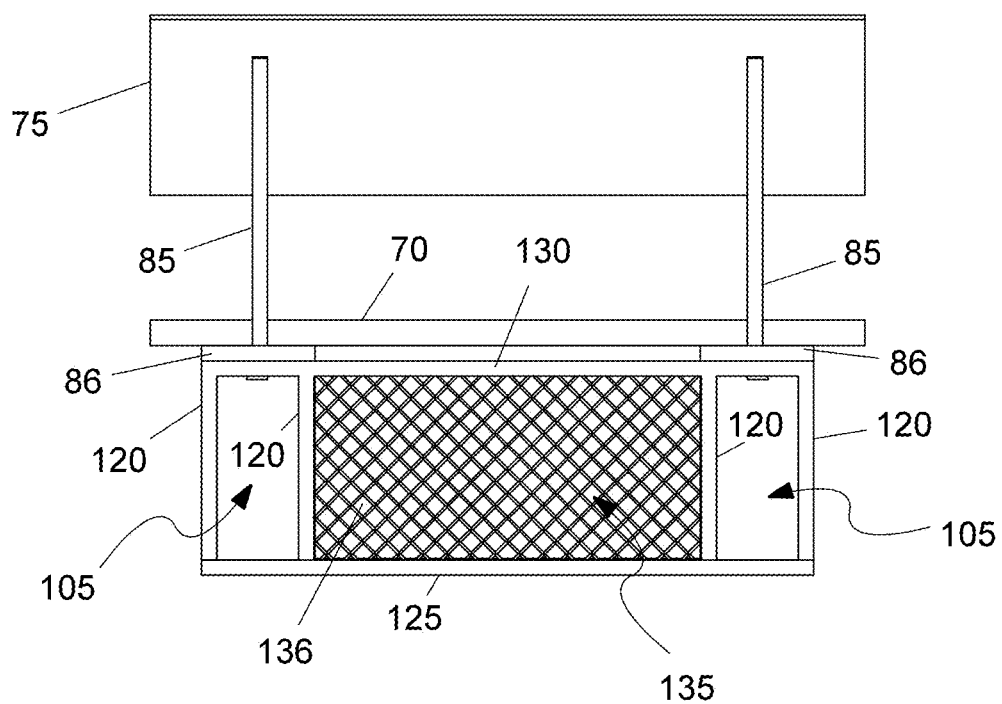
FIG. 8 is an isolated rear view of the seat assembly and seat base support, according to the preferred embodiment of the present invention.

Referring to FIG. 4, a sectional view of the four-wheel bicycle conversion kit 10, as seen along a Line I-I, as shown in FIG. 1, according to the preferred embodiment of the present invention is disclosed. This view provides increased detail on the box frame assemblies 105 consisting of the forward upright structural members 115, the aft upright structural members 120, the bottom structural members 125, and the top structural members 130. Connection to the two-wheeled bicycles 15 (as shown in FIG. 1), is made to the rear axle 150 of the rear wheels 110. In at least one (1) embodiment, the forward upright structural members 115, the aft upright structural members 120, the bottom structural member 125, and the top structural member 130 are secured by weldment 165. The vertical supports 85 and the seat connection supports 89 are attached via weldment 165 as well. Physical attachment between the kit 10 and the two-wheeled bicycles 15 is made by the rear axle 150 and the clamp 40 (as shown in FIG. 1). Said minimal attachment points allow for easy transition from two (2) conventional two-wheeled bicycles 15 to a single four-wheel bicycle.

Referring now more closely to FIG. 9a, a close-up view of the forward upright structural member 115 is disclosed. Each forward upright structural member 115 includes an upright tubular portion 216 and an upright threaded portion 218 located at the bottom end of the upright tubular portion 216. The upright tubular portion 216 may be a hollow or solid body. In this embodiment, the top end of the upright tubular member 216 may be attached or otherwise connected to the top structural member 130 of the seat base support 95 in any means other than a weldment 165.

Referring now more closely to FIG. 9b, a close-up view of the mounting bracket 155 is disclosed. Each mounting bracket 155 has a bracket planar portion 221 with an aperture located on a bottom half thereof. Immediately superjacent to the aperture 222 is a bracket tubular portion 225 having a threaded receiver 227. The aperture 22 is sized to attach to an extended portion on the rear axle 150 and secured with an axle nut 160. The bracket tubular portion 225 is hollow and further comprises the threaded receiver 227 which is capable or removably fastening to the upright threaded portion 218 of the forward upright structural member 115.

Figure 9C:
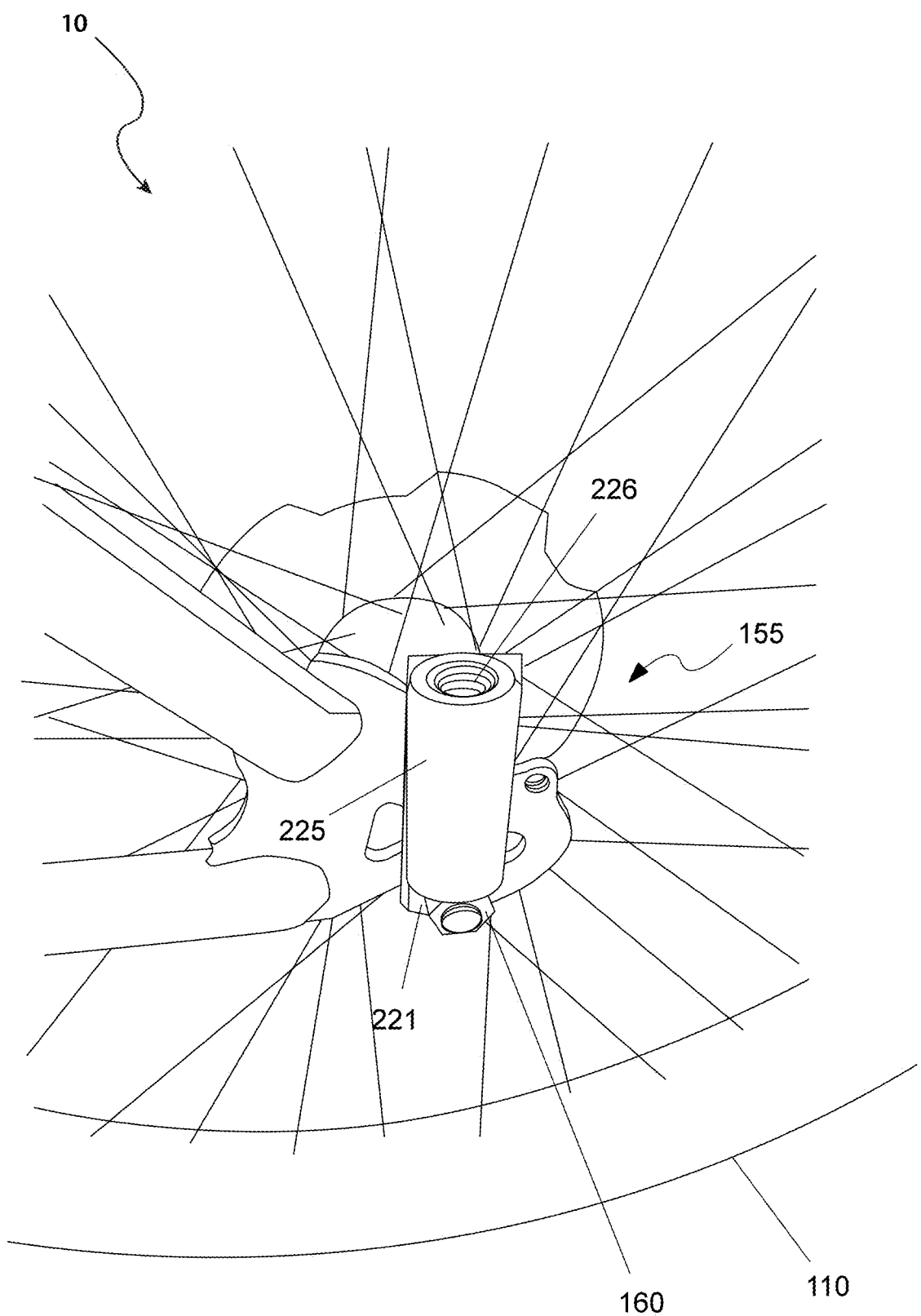
FIG. 9c is a close-up environmental view of the mounting bracket attached to a rear wheel of a bicycle, according to the preferred embodiment of the present invention.
Figure 9D:
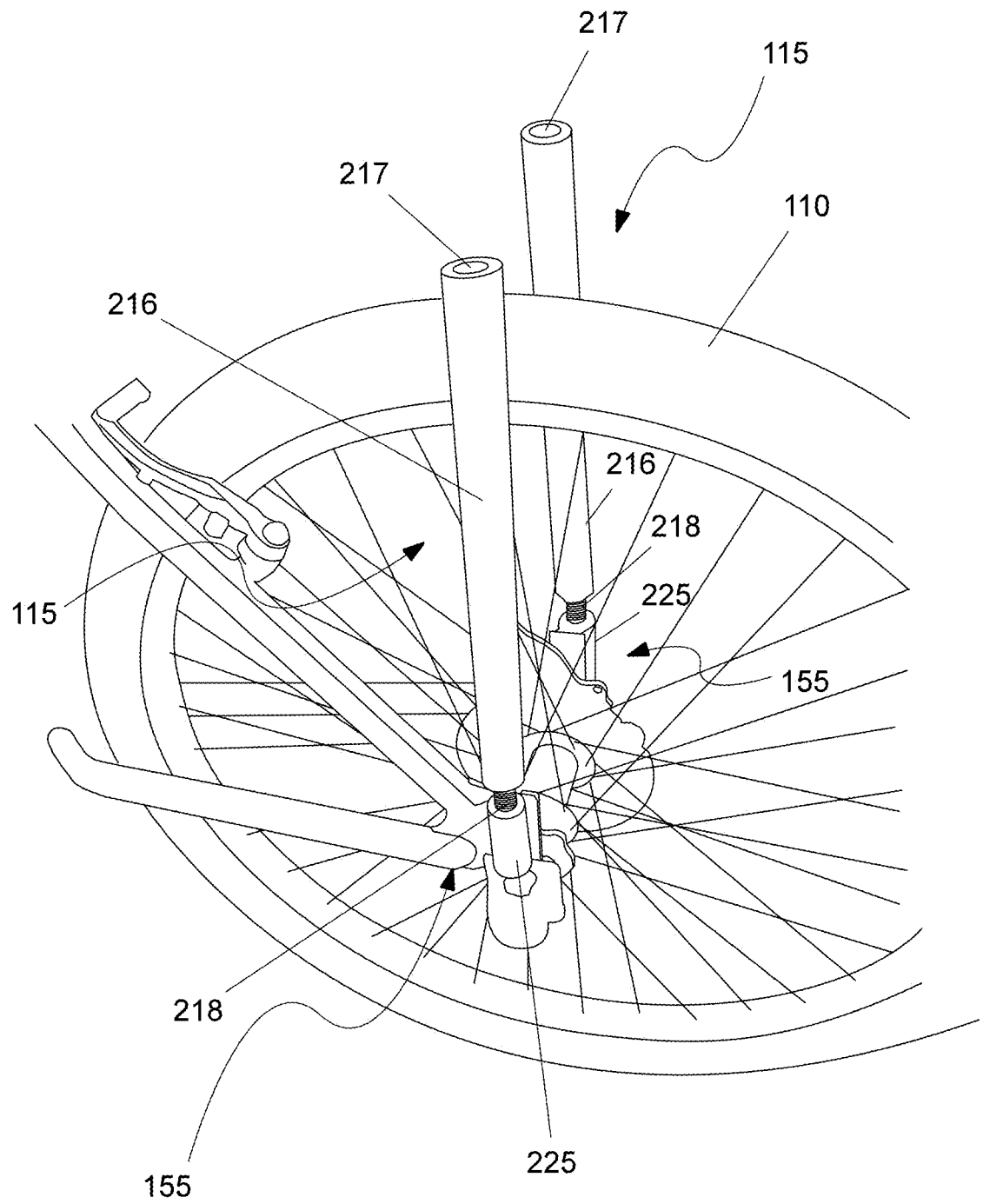
FIG. 9d is a close-up environmental view of a forward upright structural member, according to the preferred embodiment of the present invention.

Referring now to FIGS. 9c and 9d, environmental views of the forward upright structural member 115 as they are attached to the mounting brackets 155 and to the rear axle 150 is disclosed. The mounting bracket 155 connects to the rear axle 150 between the rear wheels 110 of single two-wheeled bicycle 15 and is secured by the axle nut 160. The major components of the kit 10 are made of steel, aluminum, or similar material. There are a total of four (4) forward upright structural members 115 and four (4) mounting brackets 155 in the kit 10.

2. OPERATION OF THE PREFERRED EMBODIMENT

The preferred embodiment of the present invention can be utilized by the common user in a simple and effortless manner with little or no training. It is envisioned that the kit 10 would be constructed in general accordance with FIG. 1 through FIG. 4. The user would procure the kit 10 from conventional procurement channels such as discount stores, department stores, sporting goods stores, bicycle shops, mail order and internet supply houses and the like. It is assumed that the two (2) two-wheeled bicycles 15 with identical diameter "d" 20 and wheelbase "w" 22 would already be procured or procured with the kit 10.

After procurement and prior to utilization, the kit 10 would be assembled in the following manner: the two-wheeled bicycles 15 would be placed generally side by side in an arrangement similar to FIG. 1; the conventional bicycle seat would be removed from each seat post 100; the alignment rods 45 would be attached to each handlebars 60 by the clamp 40; the connecting rod 50 would then be connected to the alignment rods 45 via the pivot points 140; the seat assembly 35 would be attached by removing both axle nut 160 from each two-wheeled bicycles 15; attaching the four (4) mounting brackets 155 and replacing the axle nut 160; and affixing the forward upright structural members 115 to the mounting brackets 155. At this point in time, the kit 10 is ready for use.

During utilization of the kit 10, the following procedure would be initiated: occupants would sit upon the seat assembly 35 and place their feet upon the pedals 80 and grasp the handlebars 60 in a conventional manner; the users would pedal in a simultaneous manner while maneuvering the kit 10. It is envisioned that one (1) of the riders may take the lead steering position while the other pedals. It is also envisioned that the kit 10 may be ridden by only a single user with the remaining two-wheeled bicycle 15 left unused.

After use of the kit 10, it may simply be parked until needed again. Additionally, the kit 10 may be removed by following the inverse of the above-mentioned installation instructions and reinstalling the seat to the seat post 100, thus returning the two-wheeled bicycles 15 to their original configuration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A four-wheel bicycle conversion kit for connecting a pair of two-wheel bicycles, comprising:
  a steering linkage, wherein the steering linkage comprises:
    a pair of clamps, each clamp being configured for removably attaching to a respective handlebar of the two-wheel bicycles;
    a pair of alignment rods, each alignment rod being secured to a corresponding clamp; and,
    a connecting rod pivotally coupled to the pair of alignment rods to provide synchronized steering motion of the handlebars;
  a seat assembly, wherein the seat assembly comprises:
    a seat base;
    a back rest; and,
    a pair of vertical supports, each vertical support being configured to support the back rest and to extend toward a seat base support;
  the seat base support, wherein the seat base support comprises:
    a six-sided frame including four forward upright structural members, four aft upright structural members, a bottom structural member, a top structural member, and a pair of seat connection supports each terminating in a seat connection configured for attachment to a respective seat post of the two-wheel bicycles;
  a pair of box frame assemblies, each box frame assembly comprising:
    an inner pair of the forward upright structural members;
    an inner pair of the aft upright structural members;
    a portion of the bottom structural member; and,
    a portion of the top structural member;
  a carrier basket disposed between the pair of box frame assemblies, wherein the carrier basket comprises:
    a basket rear wall;
    a basket front wall;
    a pair of basket side walls, at least one basket side wall being formed of a mesh material; and,
    a basket bottom wall; and,
  a mounting system, wherein the mounting system comprises:
    a plurality of mounting brackets, each mounting bracket comprising a bracket planar portion having an aperture sized for attachment to an extended portion of a respective rear axle of the two-wheel bicycles and a bracket tubular portion having a threaded receiver, the threaded receiver being configured to engage a respective upright threaded portion of the forward upright structural members.

2. The four-wheel bicycle conversion kit of claim 1, wherein:
  the forward upright structural members of the seat base support each comprises an upright tubular portion and the upright threaded portion located at a lower end of the upright tubular portion;
  each mounting bracket comprises the bracket planar portion with the aperture configured to receive the extended portion of the rear axle and the bracket tubular portion with the threaded receiver configured for removably fastening to the upright threaded portion of the forward upright structural member;
  the connecting rod is connected to the pair of alignment rods via a respective pivot point; and,
  the kit is constructed of materials selected from the group consisting of steel, aluminum, and combinations thereof.

\* \* \* \* \*